US005846273A

United States Patent [19]

Dyson

[11] Patent Number: 5,846,273

[45] Date of Patent: Dec. 8, 1998

[54] DUST SEPARATION APPARATUS

[75] Inventor: James Dyson, Bathford, United Kingdom

[73] Assignee: Notetry Limited, Wiltshire, United Kingdom

[21] Appl. No.: 860,779

[22] PCT Filed: Jan. 8, 1996

[86] PCT No.: PCT/GB96/00022

§ 371 Date: Aug. 14, 1997

§ 102(e) Date: Aug. 14, 1997

[87] PCT Pub. No.: WO96/21389

PCT Pub. Date: Jul. 18, 1996

[30] Foreign Application Priority Data

Jan. 10, 1995 [GB] United Kingdom ................... 9500424

[51] Int. Cl.[6] ................................................ B01D 45/12

[52] U.S. Cl. ................................ 55/337; 55/345; 55/353; 55/429; 55/DIG. 3

[58] Field of Search ............................. 55/429, 345, 337, 55/DIG. 3, 353

[56] References Cited

U.S. PATENT DOCUMENTS 4,443,910 4/1984 Fitzwater .
4,643,748 2/1987 Dyson .
4,853,008 8/1989 Dyson ........................................ 55/429
5,062,870 11/1991 Dyson .
5,078,761 1/1992 Dyson ........................................ 55/429
5,145,499 9/1992 Dyson ........................................ 55/429
5,160,356 11/1992 Dyson ........................................ 55/429
5,248,858 9/1993 Lin ........................................ 55/429
5,267,371 12/1993 Soler et al. ................................ 55/429

FOREIGN PATENT DOCUMENTS

0054691 A1 6/1982 European Pat. Off. .
0489565 A1 6/1992 European Pat. Off. .

*Primary Examiner*—Jay H. Woo
*Assistant Examiner*—Minh-Chau T. Pham
*Attorney, Agent, or Firm*—Ian C. McLeod; Mary M. Moyne

[57] ABSTRACT

The invention provides dust separating apparatus (10) including a cyclone (14) having an outer wall (14*a*) and an air inlet (12), a shroud (16) and an airflow path, the airflow path being arranged so as to direct an airflow flowing, in use, in the dust separating apparatus into the cyclone (14) via the air inlet (12) and out of the cyclone through the shroud (16). The air inlet (12) of the cyclone (14) is formed by a conduit (12*a*) projecting into the cyclone (14) between the outer wall (14*a*) and the shroud (16). This allows a swivel coupling to be attached to the air inlet (12) providing greater flexibility and maneuverability of the dust separating apparatus (10).

11 Claims, 2 Drawing Sheets

DUST SEPARATION APPARATUS

CROSS-REFERENCES TO RELATED APPLICATION

Not Applicable

STATEMENT REGARDING FEDERALLY SPONSORED RESEARCH OR DEVELOPMENT

Not Applicable

BACKGROUND OF THE INVENTION (1) Field of the Invention

The invention relates to dust separating apparatus, particularly but not exclusively to dust separating apparatus for use in vacuum cleaners.

(2) Description of the Related Art

Vacuum cleaners which incorporate dust separating apparatus consisting of two cyclones and a shroud are known. The cyclones are arranged one inside the other with the shroud located between them so that, in use, air first enters the low efficiency cyclone and then passes through the shroud before entering the inner, high efficiency cyclone. In order to ensure that the airflow in each cyclone follows an appropriate helical path, each cyclone has a tangential air inlet consisting of a conduit which approaches the relevant cyclone tangentially and terminates at the cylindrical or conical outer wall of the cyclone. Air flowing along the conduit then passes tangentially into the cyclone and follows the appropriate helical path.

The need for a tangential air inlet to each cyclone, combined with the belief that any irregular protrusions within the outer wall of the cyclone will disturb the airflow, has meant that, until now, all cyclonic dust separation means used in vacuum cleaners have had horizontal air inlets, ie. air inlets arranged perpendicular to the longitudinal axis of the cyclones. The development of a compact cylinder-type vacuum cleaner which utilises cyclonic dust separation apparatus has now created a need for such apparatus having an air inlet which is vertical or parallel to the axes of the cyclones. The provision of such apparatus in a vacuum cleaner would then allow a wand or hose to be attached to the inlet via a swivel coupling pivotable within a generally horizontal plane which then gives greater flexibility and freedom of movement of the wand or hose.

SUMMARY OF THE INVENTION

The invention provides a dust separating apparatus present and a vacuum cleaner. Preferable and advantageous features are set out in the detailed description.

As mentioned above, the invention allows a hose or wand to be coupled to the inlet via a swivel coupling. Also, because the conduit projects into the cyclone, the conduit is rendered easily visible and accessible thus facilitating the removal of blockages of the inlet. The projection of the conduit into the cyclone also means that the cyclone can be increased in length with the result that the cyclone has added capacity to collect separated dirt and dust.

An embodiment of the invention will now be described with reference to the accompanying drawings wherein:

DESCRIPTION OF THE PREFERRED EMBODIMENTS

Figure 1:
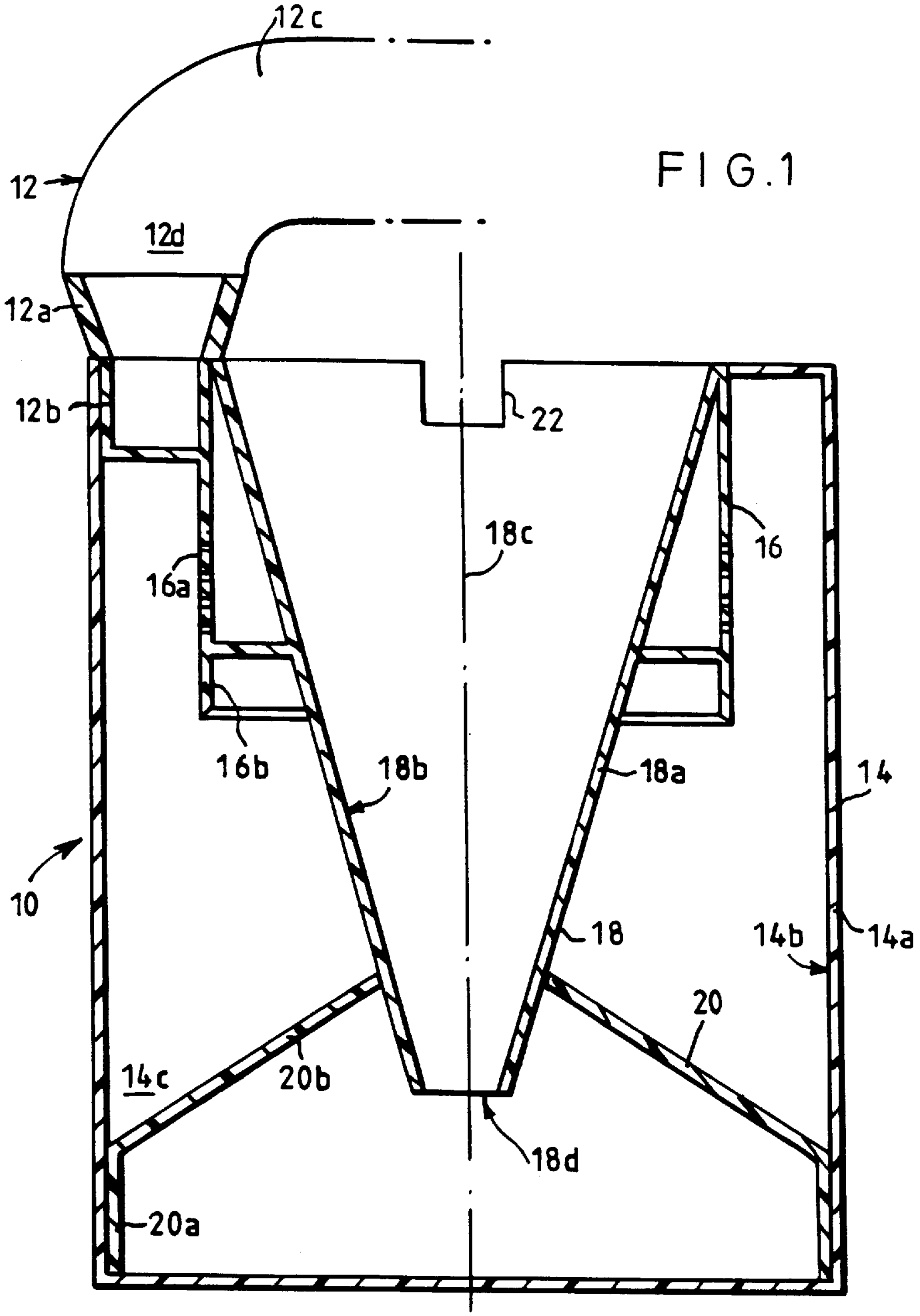
FIG. 1 is a sectional side view of dust separating apparatus according to the invention.
Figure 2:
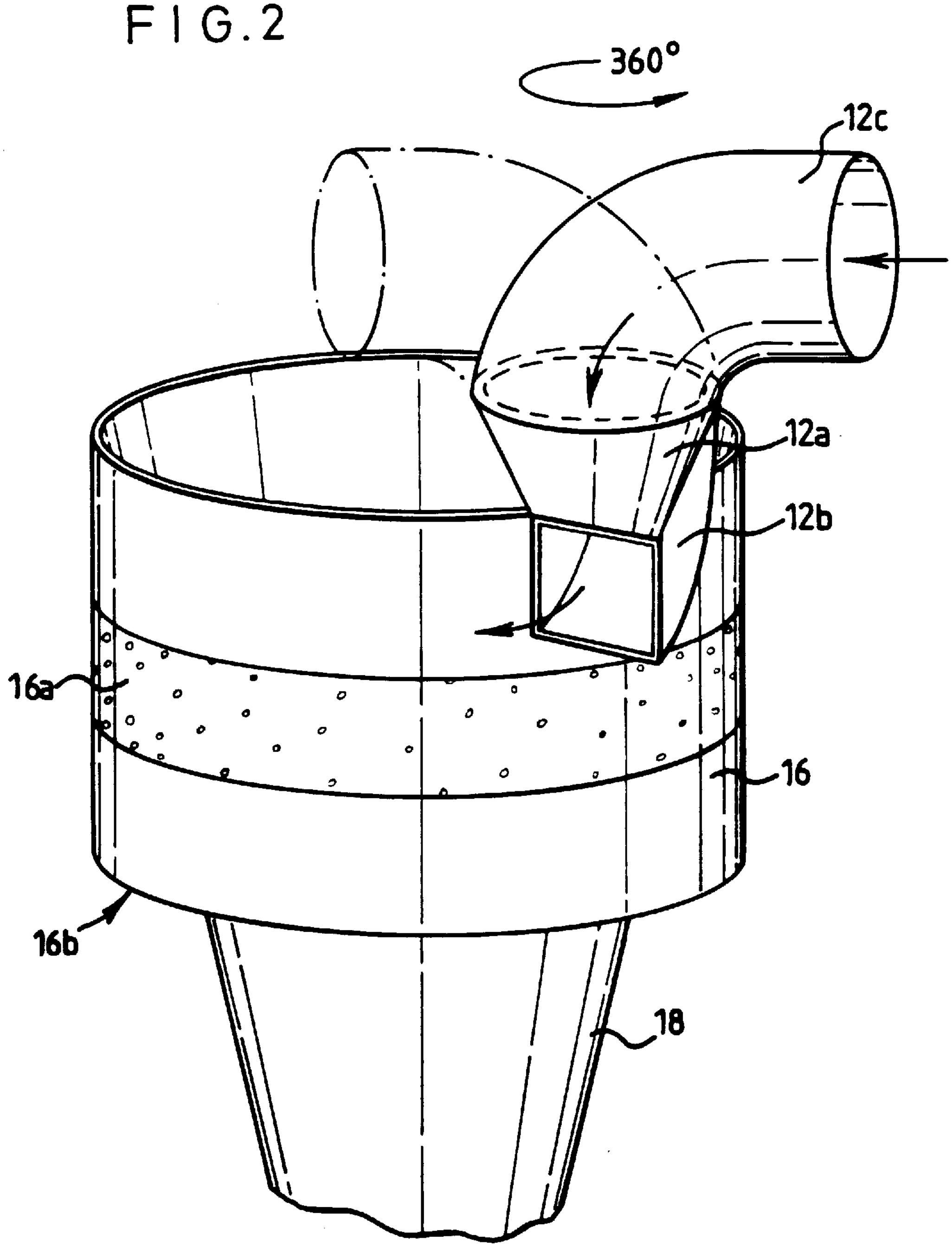
FIG. 2 is a perspective side view of the inlet and shroud forming part of the apparatus shown in FIG. 1.

The apparatus 10 shown in the drawings is suitable for use in a vacuum cleaner. The apparatus 10 incorporates a dirty air inlet 12, an outer low efficiency cyclone 14, a shroud 16, an inner high efficiency cyclone 18, a fine dust collector 20 and an exit port 22. The outer cyclone 14, the shroud 16, the inner cyclone 18, the collector 20 and the exit port 22 are all of known design and do not form essential parts of the present invention. Therefore, they will be described only briefly here.

The outer cyclone 14 has an outer wall 14*a* having an inner surface 14*b*. A dirt and dust collecting area 14*c* is located adjacent the lower end of the outer wall 14*a*.

The inner cyclone 18 consists of a frusto-conical wall 18*a* having an inner surface 18*b* and a longitudinal axis 18*c*. The conical wall 18*a* terminates in a cone opening 18*d* which opens into the fine dust collector 20. The fine dust collector 20 is substantially larger in diameter at its outer walls 20*a* than the cone opening 18*d*. The outer walls 20*a* are connected to the frusto-conical wall 18*a* of the inner cyclone 18 by means of inclined walls 20*b*. These inclined walls 20*b* also form the lower boundary of the dust collecting area 14*c* of the outer cyclone 14.

Positioned between the outer and inner cyclones 14,18 is the shroud 16. The shroud 16 is manufactured separately from the frusto-conical wall 18*a* of the inner cyclone 18 and connected thereto during manufacture. The shroud 16 has a cylindrical portion 16*a* which contains a multiplicity of perforations (not shown). Depending from the cylindrical portion 16*a* is an annular lip 16*b* comprising a parallel-sided portion having an inclined end surface. The inclined end surface is preferably inclined at an angle of 45° to the longitudinal axis 18*c* of the inner cyclone 18. Means for allowing passage of air from the interior of the shroud 16 to the interior of the inner cyclone 18 are provided but, for reasons of clarity, are not shown. The air transfer means ensure that air passing from the interior of the shroud 16 to the interior of the inner cyclone 18 enter the upper end of the inner cyclone 18 in a tangential manner.

The inner cyclone 18 is also provided with an exit port 22 which is located substantially centrally of the end of the inner cyclone 18 having the larger diameter. The exit port 22 is conveniently connected to an appropriate clean air exhaust port.

The apparatus shown in FIG. 1 is normally used in the following manner. Dirt-laden air enters the outer cyclone 14 tangentially via an air inlet. The airflow spirals down the inner surface 14*b* of the outer wall 14*a* and, whilst the airflow then continues along the airflow path by passing upwardly towards the shroud 16, larger particles of fluff and dirt are collected in the dirt and dust collecting area 14*c* of the outer cyclone 14. As the airflow passes towards the shroud 16, the lip 16*b* discourages any blocking of the perforations of the shroud 16. The airflow passes through the perforations in the cylindrical portion 16*a* of the shroud 16 and then passes from the interior of the shroud 16 to the upper end of the inner cyclone 18. Because of the tangential entry into the inner cyclone 18, the airflow spirals down the inner surface 18*b* of the frusto-conical wall 18*a* of the inner cyclone 18. Most of the air subsequently moves towards the axis 18*c* of the inner cyclone 18 and then exits via the exit port 22. However, dirt and dust particles previously entrained within the airflow spiral downwards towards the cone opening 18*d* and emerge into the collector 20 at very high speeds. The dirt and dust particles are flung towards the side walls 20*a* of the collector 20 and collect at the bottom of the collector 20. The remaining air passes back through the cone opening 18*d*into the inner cyclone 18 and subsequently exits the apparatus via the exit port 22.

In all prior art apparatus, the air inlet 12 has consisted of a conduit arranged substantially horizontally, ie. perpendicular to the longitudinal axis 18*c* of the inner cyclone 18, and which terminates at the outer wall 14*a* of the outer cyclone 14. This has previously effected a tangential entry into the outer cyclone 14 without causing any unnecessary disturbance to the airflow within the outer cyclone 14. According to the present invention however, the inlet 12 consists of a conduit 12*a* arranged substantially vertically or parallel to the axis 18*c* of the inner cyclone 18. The conduit 12*a* passes into the interior of the outer cyclone 14 between the outer wall 14*a* and the cylindrical portion 16*a* of the shroud 16. The conduit 12*a* also comprises a right angle bend 12*b* which causes the incoming airflow to exit the conduit 12*a* in a manner which is tangential to the outer wall 14*a*. It has been found that this arrangement does not unduly disturb the airflow within the outer cyclone 14. The distance between the outer wall 14a of the outer cyclone 14 and the cylindrical portion 16a of the shroud 16 is preferably between 15 mm and 30 mm and the efficiency of the apparatus is particularly high if this distance is substantially 20 mm.

It is highly advantageous to be able to-introduce the airflow into the outer cyclone from above the outer cyclone 14. In particular, this allows a hose 12*c* to be attached to the conduit 12*a* by means of a swivel coupling. When the apparatus 10 is utilised in a cylinder-type vacuum cleaner, this allows the hose 12*c*, to the end of which a cleaning tool is attached, to be swivelled through 360° about the axis 12*d* of the conduit 12*a*, ie. within a substantially horizontal plane. This in turn allows greater flexibility and maneouverability of the machine than would be achievable without the swivel coupling.

It will be appreciated that it is not necessary to attach the hose 12*c* to the conduit 12*a* in a plane which is perpendicular to the axis 12*d* of the conduit. An inclined connection could be provided which would allow the hose 12*c* to swivel in a plane which is inclined to the axis 12*d*. This is particularly useful when the apparatus 10 is incorporated into a vacuum cleaner in an inclined manner, ie. the axis 18*c* is inclined to the vertical. This, in turn, means that the axis 12*d* will be inclined to the vertical but the swivel coupling between the hose 12*c* and the conduit 12*a* can be such that the hose 12*c* can swivel in a substantially horizontal plane or, indeed, any other convenient plane.

It will be apparent to any reader skilled in the art that the invention is not limited to the specific embodiment described above. Various modifications and alterations will fall within the scope of the invention.

I claim:

1. Dust separating apparatus comprising a cyclone having an outer wall and an air inlet into the cyclone, a shroud for an air outlet spaced apart from the outer wall of the cyclone and an airflow path, the airflow path being arranged so as to direct an airflow flowing, in use, in the dust separating apparatus into the cyclone via the air inlet and out of the cyclone through the shroud, wherein the air inlet of the cyclone is formed by a conduit projecting into an interior of the cyclone between the outer wall thereof and the shroud in a direction substantially parallel to a longitudinal axis of the cyclone.

2. Dust separating apparatus as claimed in claim 1, wherein the space between the outer wall of the cyclone and the shroud is between 15 mm and 30 mm.

3. Dust separating apparatus as claimed in claim 2, wherein the space between the outer wall of the cyclone and the shroud is substantially 20 mm.

4. Dust separating apparatus as claimed in any one of claims 1, 2 or 3, wherein the conduit forming the air inlet is arranged to enter the cyclone substantially parallel to the longitudinal axis of the cyclone.

5. Dust separation apparatus as claimed in any one of claims 1, 2 or 3, wherein the air inlet includes a right-angle bend mounted on an end of the conduit in the interior of the cyclone so as to cause the airflow to flow, in use, in a tangential manner in the cyclone.

6. Dust separation apparatus as claimed in any one of claims 1, 2 or 3, wherein a swivel coupling is provided between the conduit and a second airflow path immediately upstream of the conduit.

7. Dust separation apparatus as claimed in any one of claims 1, 2 or 3, wherein the conduit is formed integrally with the shroud.

8. Dust separation apparatus as claimed in any one of claims 1, 2 or 3, wherein the shroud incorporates a lip depending from an edge of the shroud remote from the conduit.

9. Dust separation apparatus as claimed in any one of claims 1, 2 or 3 wherein a second cyclone is arranged downstream of the shroud.

10. Dust separating apparatus as claimed in any one of claims 1, 2 or 3 wherein the air inlet includes a right angle bend which is mounted on an end of the conduit in the interior of the cyclone so as to cause the airflow to flow, in use, in a tangential manner in the cyclone and wherein a swivel coupling is provided between the conduit and a second airflow path immediately upstream of the conduit.

11. A vacuum cleaner having a dust separating apparatus which comprises, a first cyclone having an outer wall and an air inlet into the first cyclone, a shroud for an air outlet spaced apart from the outer wall of the first cyclone, a first airflow path being arranged so as to direct an airflow flowing, in use, in the dust separating apparatus into the first cyclone via the air inlet and out of the first cyclone through the shroud, and a second cyclone arranged downstream of the shroud, wherein the air inlet of the first cyclone includes a conduit projecting into an interior of the first cyclone between the outer wall and the shroud in a direction substantially parallel to a longitudinal axis of the first cyclone and a right angle bend mounted on an end of the conduit in the interior of the first cyclone for causing airflow to flow, in use, in a tangential manner in the first cyclone and wherein a swivel coupling is provided on an end of the conduit opposite the right angle bend adjacent a second airflow path immediately upstream of the conduit.

* * * * *